United States Patent [19]

Pardo et al.

[11] Patent Number: 5,549,386
[45] Date of Patent: Aug. 27, 1996

[54] IDLER BEARING MOUNT

[75] Inventors: Warren A. Pardo, Bel Air; Valentino Gabriele, Baltimore, both of Md.

[73] Assignee: J.C. Pardo & Sons, Baltimore, Md.

[21] Appl. No.: 567,994

[22] Filed: Dec. 4, 1995

[51] Int. Cl.[6] ............................................. B01F 7/04
[52] U.S. Cl. ................................. 366/331; 99/348
[58] Field of Search ..................... 366/279, 331, 366/45, 46, 47, 64, 241, 244, 245, 247, 249, 250, 251, 297, 298, 318, 311; 99/348

[56] References Cited

U.S. PATENT DOCUMENTS

| 4,097,926 | 6/1978 | Face | 366/046 |
| 4,199,266 | 4/1980 | Giusti | 366/296 |
| 4,571,091 | 2/1986 | Pardo et al. | 366/311 |
| 4,790,667 | 12/1988 | Pardo et al. | 366/311 |
| 5,277,489 | 1/1994 | Hamm | 366/331 |

*Primary Examiner*—Robert W. Jenkins
*Attorney, Agent, or Firm*—Kenneth E. Darnell

[57] ABSTRACT

An idler bearing mount useful for mounting a rotary shaft of a horizontal agitator or the like within a kettle or similar container within which materials being processed are stirred or mixed, the invention includes a replaceable idler pin and bushing, thereby allowing replacement of said idler pin and/or bushing in the event of excessive wear or damage to the pin or bushing. The structure of the present idler bearing mount is rapidly disassembled for cleaning according to sanitary standards and can be thoroughly cleaned even though a portion of the structure is mounted directly to an inner wall portion of the kettle.

18 Claims, 4 Drawing Sheets

IDLER BEARING MOUNT

BACKGROUND OF THE INVENTION

1. Field of the Invention

The invention relates generally to structure for mounting the free end or non-driven end of a rotary shaft mounted for operation within a kettle or other container, the invention particularly relating to an idler bearing mount for mounting the free end of the rotary shaft of a mixing agitator in relation to the inner wall of a kettle.

2. Description of the Prior Art

The processing of many materials including pharmaceuticals, cosmetics, foodstuffs and the like on an industrial scale often requires mixing or stirring operations and may, in some circumstances, require the scraping of inner wall surfaces of a kettle or other container within which materials are being processed. Scraping of wall surfaces is particularly necessary in many situations involving the heating and/or cooking of food materials in large cooking kettles. Mixing agitators which include a kettle wall scraping capability are disclosed in U.S. Pat. Nos. 4,571,091 to Pardo et al and 4,790,667 to Pardo et al. The Pardo et al agitators include rotary shafts mounted within a kettle with the shaft disposed horizontally. The structure of the Pardo et al agitators has proven to be particularly useful in the art with a substantial contribution of the usefulness of these agitators being the horizontal disposition of the rotary shaft of the agitators. The Pardo et al horizontal agitators can be mounted as is shown and described in the Pardo et al patents, the bearing structure described by Pardo et al allowing rapid disassembly of the agitator and bearing structure such that daily cleaning can be easily accomplished. Giusti, in U.S. Pat. No. 4,199,266, also describes a mixing agitator having a scraping capability wherein a rotary shaft is disposed horizontally within a cooking kettle, the shaft having a substantially circular agitator mounted thereon and wherein the agitator is formed of a pair of substantially annular semi-circular blades each having an internal segment-shaped web. The annular blades each carry a plurality of scrapers at their respective peripheries for scraping of internal surfaces of a kettle. Giusti also provides bearing structure for mounting of the non-driven end of the horizontal rotary shaft disclosed in U.S. Pat. No. 4,199,266. In situations where metal to metal contact must occur within or near the body of food materials being processed, bearings must operate within proscriptions of law relating to the use of lubricants within the body of food materials being processed. In order to avoid metal to metal contact in such processing situations, the prior art has included as one solution the use of plastic materials such as acetal interposed between metal surfaces to provide a necessary degree of lubrication. While the acetal spacing element, usually a bushing, could be readily replaced in these prior art situations, the bushing formed of acetal or other "plastic" material usually hardens in operation and becomes abrasive with the result that an idler pin forming a portion of the bearing structure is worn down. Since prior art idler bearing mounting structures do not allow for replacement of the idler pin, repair of a mount so configured is difficult with the result generally being the necessity for replacement of the entire kettle structure on which such bearings are permanently mounted.

The present invention provides an idler bearing mount particularly useful with horizontal agitators in the processing of materials which can include the heating and/or cooking of food materials in a kettle either with or without scraping of inner walls of the kettle. The present idler bearing mount is configured to allow rapid removal from a kettle so that the mount as well as the kettle and agitator can be disassembled easily for cleaning on a daily basis according to accepted sanitary standards. The present idler bearing mount of the invention is formed of materials which meet USDA standards for metal to metal contact within a body of food materials being processed and in food processing situations where the use of lubricants is regulated. The present idler bearing mount of the invention can also be readily and rapidly repaired in the event of excessive wear or damage to idler pin and/or bushing structure of the mount since the idler pin and bushing can be replaced. Accordingly, the present invention provides substantial performance, operational and cost advantages over those bearing structures previously used in the art for the mounting of a horizontally disposed rotary shaft of a mixing agitator structure used in a kettle or similar container for processing of materials including food materials, pharmaceuticals and the like.

SUMMARY OF THE INVENTION

The present invention provides an idler bearing mounting structure capable of being used to mount a rotary shaft and particularly a horizontally disposed rotary shaft, such as the shaft of an agitator as is described in U.S. Pat. No. 4,790,667, within the interior of a processing kettle within which materials such as foodstuffs, pharmaceuticals or the like are to be processed. The idler bearing mount of the invention provides a bearing surface for the free end of a rotary shaft, that is, the non-driven end of the shaft, which extends into the interior of the kettle. The idler bearing mount of the invention is configured to allow rapid removal of the mount as well as of the agitator from the interior of the kettle so that the mount, agitator and kettle can be readily cleaned daily according to sanitary standards common in the industry. The idler bearing mount is also formed of materials which do not require lubrication on bearing surfaces, the structure therefore meeting USDA standards for metal to metal contact for bearing surfaces and the like which function immersed in food materials being processed, such situations being commonplace especially in the food processing industry. The structure of the present invention is also repairable in the event of excessive wear or damage through replacement of appropriate portions of the structure.

The idler bearing mount of the invention includes a replaceable bushing element which is formed of a corrosion-resistant, anti-galling nickel base alloy such as is manufactured by Waukesha Foundry, Inc. of Waukesha, Wisc., the preferred nickel base alloy useful according to the invention being known as 88 Alloy. While other alloys produced by Waukesha Foundry, Inc., such as nickel base alloys known as 23 Alloy and 54C Alloy, can also be used, most processing situations within which the invention finds utility do not involve operating temperatures higher than the nominal operating temperatures of 88 Alloy. In the case of 23 Alloy, operating temperatures of 600° F. can be accommodated while 54C Alloy allows use at temperatures up to 1600° F. In the food processing industry, the use of the 54C Alloy is not necessary and the use of 88 Alloy is preferred. The 88 Alloy serves particularly well as the replaceable bushing element of the present idler bearing mount since the bushing element so formed can be used in contact with stainless steel, chromium plate and a number of other metals without galling or seizing due to the chafing action of metal bearing surfaces which occurs on rotation of an agitator shaft mounted by the present idler bearing mount. Use of the 88

Alloy as preferred allows rotary operation of an agitator shaft without galling or seizing and within a metal to metal environment wherein the use of lubricants is regulated. The 88 Alloy forming the bushing element of the present idler bearing mount is formed with a bearing surface which mates with a stainless steel bearing surface of an idler pin which is threaded into the end of the agitator shaft which extends into the interior of a processing kettle, bearing contact occurring between corresponding bearing surfaces of the bushing element and of the idler pin.

The idler bearing mount of the invention further includes a cylindrical stainless steel idler bushing holder which is welded to an interior wall of a kettle or other container, the bushing holder having a retainer pin threadably received in a wall thereof, the replaceable bushing element has a T-shaped retaining slot on one surface thereof such that the retaining pin is received in the leg of the slot on insertion of the bushing element into the bushing holder, the bushing element then being rotated to one or the other of the arms of the T-shaped slot to hold the bushing element in place within the bushing holder. The end of the idler pin extending from the end of the agitator which is tapped to receive the threaded end of the idler pin is then received into the bushing element with bearing contact occurring between corresponding bearing surfaces of the bushing element and of the idler pin.

The idler bearing mount of the invention is thus rapidly and easily removed from the kettle for daily cleaning or for repair in the event of excessive wear or damage to the mount. The invention thus provides substantial advantages over the prior art especially in food processing situations wherein most bearing surfaces provided on inner walls of food processing kettles do not meet sanitary standards even though such structures have long been used in the art.

It is therefore an object of the invention to provide an idler bearing mount intended for mounting horizontal agitator shafts such as are used for the processing of materials including food materials in a kettle or the like, the mount providing a bearing surface for the non-driven end of a rotary shaft of the agitator.

It is another object of the invention to provide an idler bearing mount capable of providing a bearing surface for the non-driven end of an agitator mounted in operative relation to a processing kettle wherein at least portions of the mount can be replaced.

It is a further object of the invention to provide an idler bearing mount intended to mount a mixing agitator within a processing kettle and wherein the mount can be rapidly and easily removed from the kettle for cleaning according to accepted sanitary standards.

Other objects and advantages of the invention will become more readily apparent in light of the following detailed description of the preferred embodiments.

DESCRIPTION OF THE PREFERRED EMBODIMENTS

The disclosures of U.S. Pat. Nos. 4,571,091 and 4,790,667 to Pardo et al are incorporated hereinto by reference.

Figure 1:
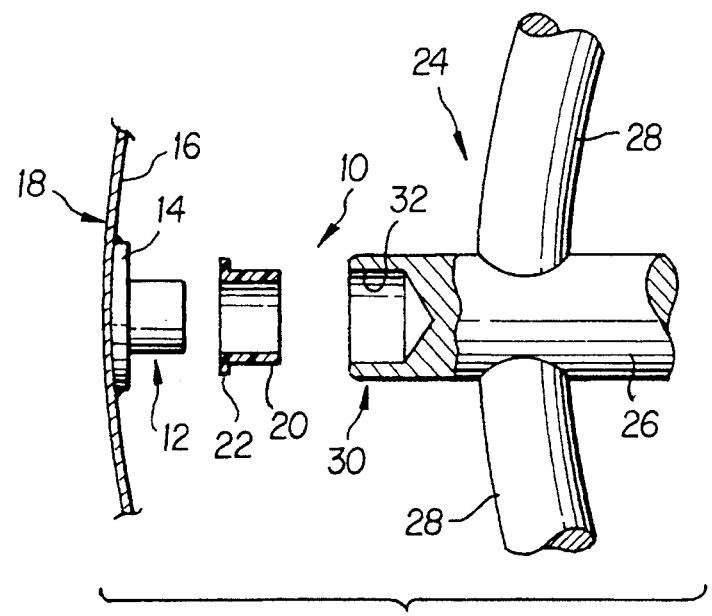
FIG. 1 is an assembly view in elevation and in partial section of a prior art idler pin and bushing structure used for mounting the non-driven end of a rotary shaft to a kettle wall.

Referring now to the drawings and particularly to FIG. 1, a prior art idler bearing is seen generally at 10 to comprise an idler pin 12 having a base 14, the base 14 being welded to inner wall 16 of kettle 18, only a portion of the kettle being shown for simplicity of illustration. The idler pin 12 and the base 14 can be unitarily formed of stainless steel or equivalent material suitable for use in a food processing situation, for example, the base 14 thereby being easily welded to the wall 16 which is also conventionally formed of stainless steel. A sleeve-like idler bushing 20 formed conventionally of an acetal "plastic" material is cylindrically shaped with an annular flange 22 formed at one end thereof. The idler bushing 20 is fitted flushly over the idler pin 12 with the annular flange 22 abutting outer surfaces of the base 14. An agitator seen generally at 24 has a rotary shaft 26 which carries curvilinear supports 28, only a portion of the structure of the agitator 24 being shown for simplicity of illustration. The agitator 24 can take the form of that agitator described in U.S. Pat. No. 4,790,667, the supports 28 mounting scraper elements (not shown) used for scraping the inner wall 16 of the kettle 18 as is described in the aforesaid patent. The distal end 30 of the shaft 26 is bored out to form bore 32 which receives the idler bushing 20 thereinto, the idler bushing 20 forming a snug, press-fit in the bore 32. In operation, the idler bushing 20 thus moves relative to the idler pin 12 on rotation of the agitator 24 about the longitudinal axis of the rotary shaft 26. The outer cylindrical surfaces of the idler pin 12 and the inner cylindrical surfaces of the idler bushing 20 thus bear against each other to form bearing surfaces for accommodating rotation of the shaft 26. In this prior art structure, the acetal idler bushing 20 can become hard in operation and abrasive to the degree that the bushing 20 can wear the idler pin 12 to a degree that the structure must be repaired or scrapped. Since the idler pin 12 of the prior art idler bearing 10 is not replaceable, repair of said pin 12 is difficult. While the acetal idler bushing 20 can be replaced in the structure of the prior art idler bearing 10, inattention to appropriate periodic replacement can result in excessive wearing of the idler pin 12 and thus a loss of utility of the prior art idler bearing 10.

Figure 2:
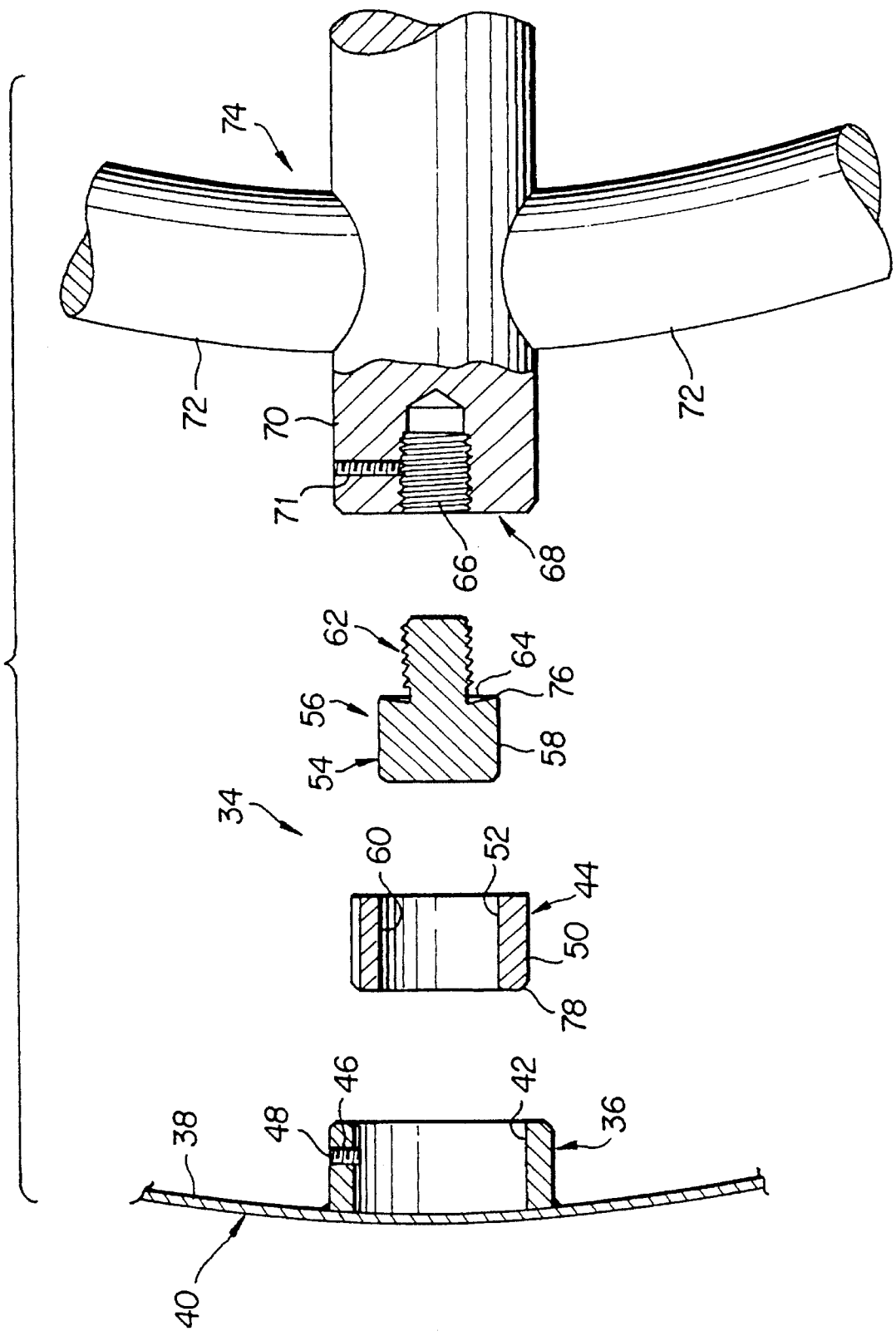
FIG. 2 is an assembly view in elevation and in partial section of an idler bearing mount according to the invention.
Figure 3:
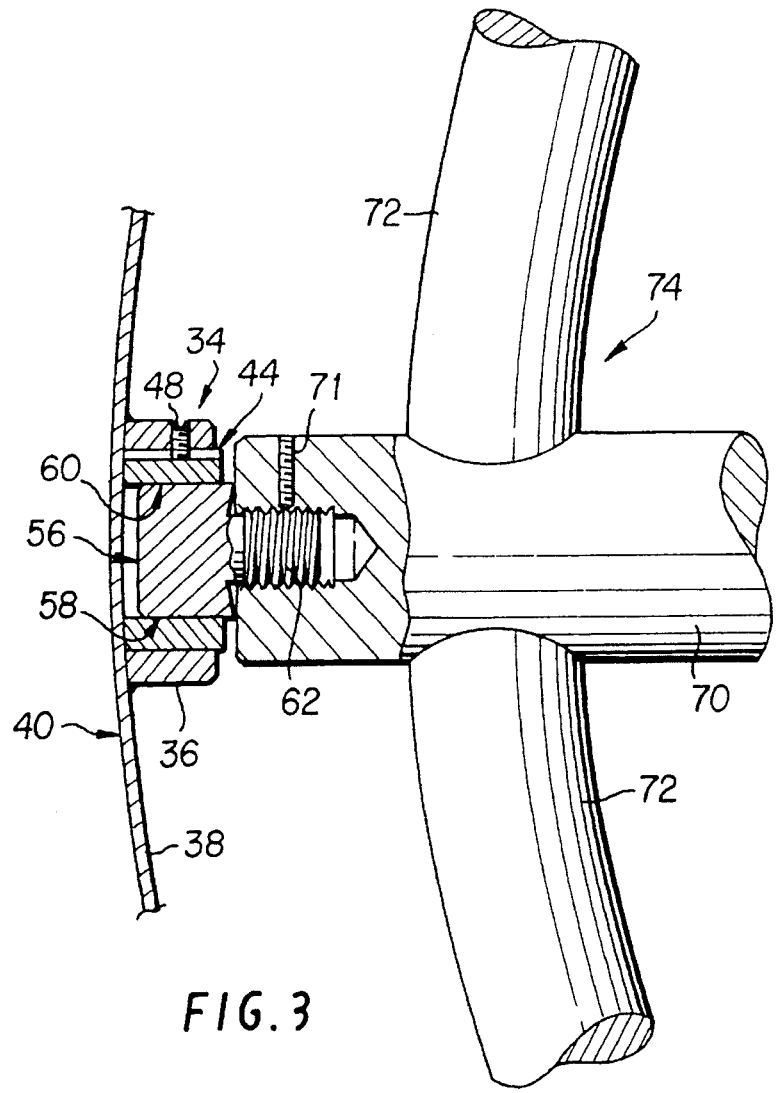
FIG. 3 is an elevational view in partial section of the structure of FIG. 2 in an assembled form.

Referring now to FIGS. 2 and 3, an idler bearing mount of the invention is seen generally at 34 to comprise an idler bushing holder 36 mounted directly to an inner wall 38 of kettle 40. The idler bushing holder 36 is cylindrical in conformation and has a channel 42 formed centrally therein and dimensioned to receive a replaceable idler bushing 44 thereinto. The bushing holder 36 is provided with an axially extending bore 46 which is threaded to receive a retainer pin 48, the retainer pin 48 being manipulated to cause a portion thereof to extend into the channel 42 and to hold the bushing 44 in place as will be described hereinafter.

The replaceable idler bushing 44 is formed of a cylindrical body portion 50 and has a channel 52 extending centrally therethrough, the channel 52 being dimensioned to receive bearing element 54 of replaceable idler pin 56 thereinto for movement between cylindrical bearing surfaces 58 of the bearing element 54 and cylindrical bearing surfaces 60 of the bushing 44.

The replaceable idler pin 56 is further formed with a threaded mounting shaft 62 which is generally cylindrical in conformation and which is reduced in diameter relative to the bearing element 54. The threaded shaft 62 has a longitudinal axis which is coincident with the longitudinal axis of the bearing element 54. A slight annular depression 64 is machined into that surface of the bearing element 54 from which the threaded shaft 62 extends. The threaded shaft 62 of the replaceable idler pin 56 threads into a threaded bore 66 tapped into distal end 68 of rotary shaft 70 such that the idler pin 56 can be unthreaded from the shaft 70 and replaced when necessary. Excessive wear of the replaceable idler bushing 44 is similarly accommodated by replacement of said idler bushing 44. The rotary shaft 70 is seen to mount curvilinear supports 72 which may in turn mount scraping elements (not shown) as is described in U.S. Pat. No. 4,790,667, the rotary shaft 70 and the support 72 comprising portions of an agitator 74 used for mixing of materials within the kettle 40. Other agitators and other structures including rotary shafts can be mounted by the idler bearing mount 34 thus described. A set screw 71 acts to hold the bearing element 54.

As is seen in FIG. 3 in particular, the idler bearing mount 34 is seen in an assembled configuration whereby the distal end 68 of the shaft 70 is mounted, the distal end 68 being the non-driven end of the shaft 70. As is best seen in FIG. 3, annular edge 76 of the bearing element 54, which annular edge 76 circumscribes the annular depression 64, abuts against opposing surfaces of the distal end 68 of the shaft 70 to provide a desired degree of tension. As is common in the manufacture of mixing structures employed in the processing of food materials and other materials, the kettle 40, the bushing holder 36, the retainer pin 48, the idler pin 54 and the agitator 74 are preferably formed of stainless steel of a type approved for contact with food materials in the event that food materials are to be processed within the kettle 40.

Figure 7:
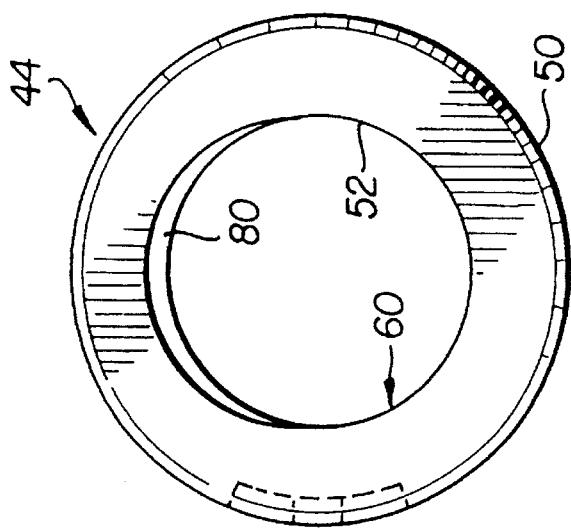
FIG. 7 is a rear end view of the idler bushing element.

The idler bushing 44 is preferably formed, in situations where food materials are to be processed within the kettle 40, of a solid piece of a nickel base alloy which is corrosion-resistant and anti-galling and which particularly allows metal to metal contact without the need for lubrication other than that provided by the bushing 44 itself. The idler bushing 44 is particularly formed of a material known as 88 Alloy which is a product of the Waukesha Foundry, Inc. of Waukesha, Wisc., further description of the 88 Alloy being provided hereinafter. The idler bushing 44 is further shown in FIGS. 4 through 8. As aforesaid, the idler bushing 44 comprises the cylindrical body portion 50 having the channel 52 formed centrally therethrough, inner cylindrical wall surfaces of the channel 52 comprising the cylindrical bearing surfaces 60 previously mentioned as bearing against the cylindrical bearing surfaces 58 of the idler pin 56. At a first end of the body portion 50 of the bushing 44, an annular bevel 78 is formed about an outer perimetric edge of said body portion 50. As is best seen in FIGS. 5 and 7, one half of the channel 52 at the end of the body portion 50 opposite the annular bevel 78 is machined out to form a semi-annular scalloped portion 80 which facilitates removal of the shaft 70 of the agitator 74 when the agitator 74 is removed from the kettle 40 for cleaning or other maintenance.

Figure 4:
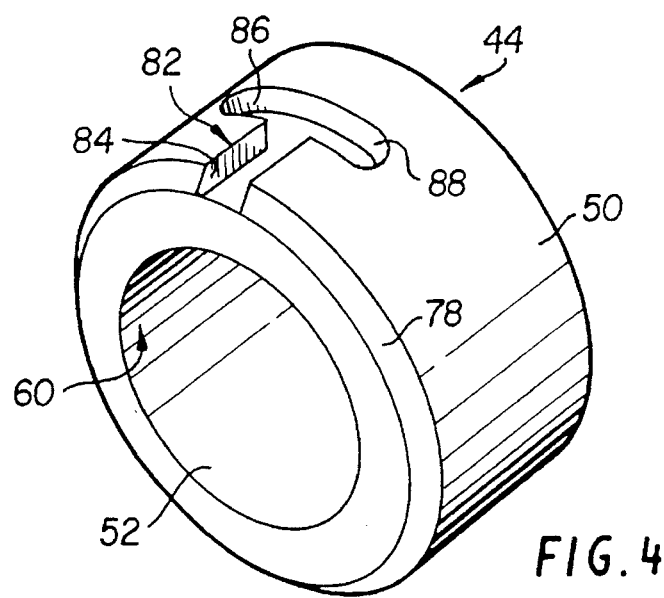
FIG. 4 is a perspective view of the idler bushing element of the invention.
Figure 5:
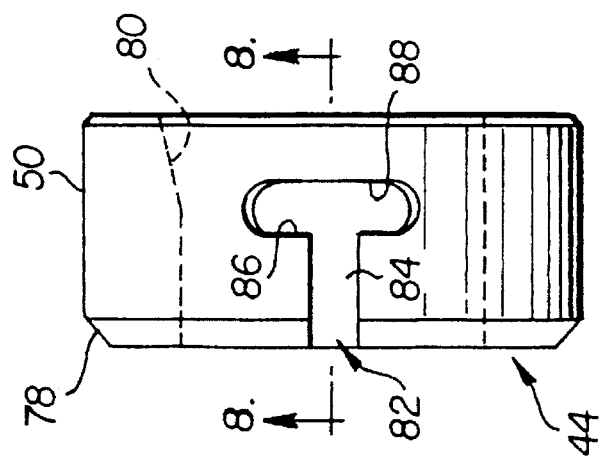
FIG. 5 is a side elevational view of the idler bushing element of the invention.
Figure 8:
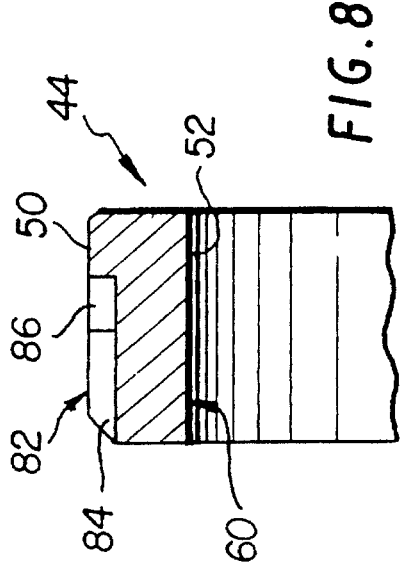
FIG. 8 is a section taken through lines 8—8 of FIG. 5.
Figure 6:
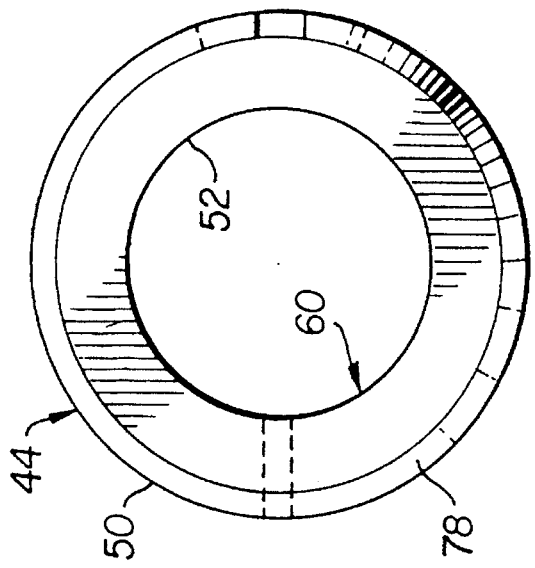
FIG. 6 is a front end view of the idler bushing element.

As is best seen in FIGS. 4 and 5, a T-shaped slot 82 is formed in the body portion 50 of the bushing 44, the slot 82 being machined out of outer surfaces of the body portion 50 at a location thereof which is substantially 90° in angular rotation from the middle of the scalloped portion 80. The slot 82 is formed of a slot leg 84 which extends through the annular bevel 78 to form a passageway through which that end of the retainer pin 48 which extends into the channel 42 is accommodated for movement until the retainer pin 48 moves into opposition with left and right slot arms 86 and 88. The idler bushing 44 is then rotated either left or right depending upon the direction of rotation of the rotary shaft 70 so that the bushing 44 is essentially locked in place. The bearing element 54 of the idler pin 56 is then received into the channel 52 of the idler bushing 44, the threaded shaft 62 of the idler pin 56 having already been fastened to the distal end 68 of the shaft 70 by mating of said threaded shaft 62 with the threaded bore 66 at the distal end of the shaft 70 as aforesaid.

In contradistinction to the prior art such as the prior art idler bearing 10 shown in FIG. 1, the idler pin 56 can readily be replaced in the event of excessive wear or damage. Further, the idler bushing 44 can also be replaced in the event of wear of damage. Accordingly, wear due to inappropriate maintenance and damage due to accident of the idler bushing 44 and/or of the idler pin 56 does not result in a useless mounting for the agitator 74 within the kettle 40. The idler bearing mount 34 of the invention can be renewed by replacement of either or both of the replaceable idler bushing 44 and the replaceable idler pin 56.

As aforesaid, the idler bushing 44 is formed of a nickel base alloy produced by Waukesha Foundry, Inc., the alloy particularly intended for use being known as 88 Alloy and being nominally formed of nickel with the following alloy constituents:

| | |
|---|---|
| Carbon | .03% |
| Tin | 4.0% |
| Manganese | 1.0% |
| Molybdenum | 3.0% |
| Iron | 1.5% |
| Bismuth | 4.0% |
| Silicon | .30% |
| Chromium | 12.5% |

While the 88 Alloy produced by Waukesha Foundry, Inc. is preferred, it is to be understood that other materials can be employed including other alloys produced by Waukesha Foundry, Inc. For processing situations wherein added lubrication can be employed without violation of governmental standards, materials other than the Waukesha alloys can be employed. It is further to be understood that the idler bushing 44 can be formed of stainless steel or the like while the material forming the bearing surfaces 58 of the bearing element 54 could be formed of a self-lubricating material such as the Waukesha alloys described herein.

Figure 9:
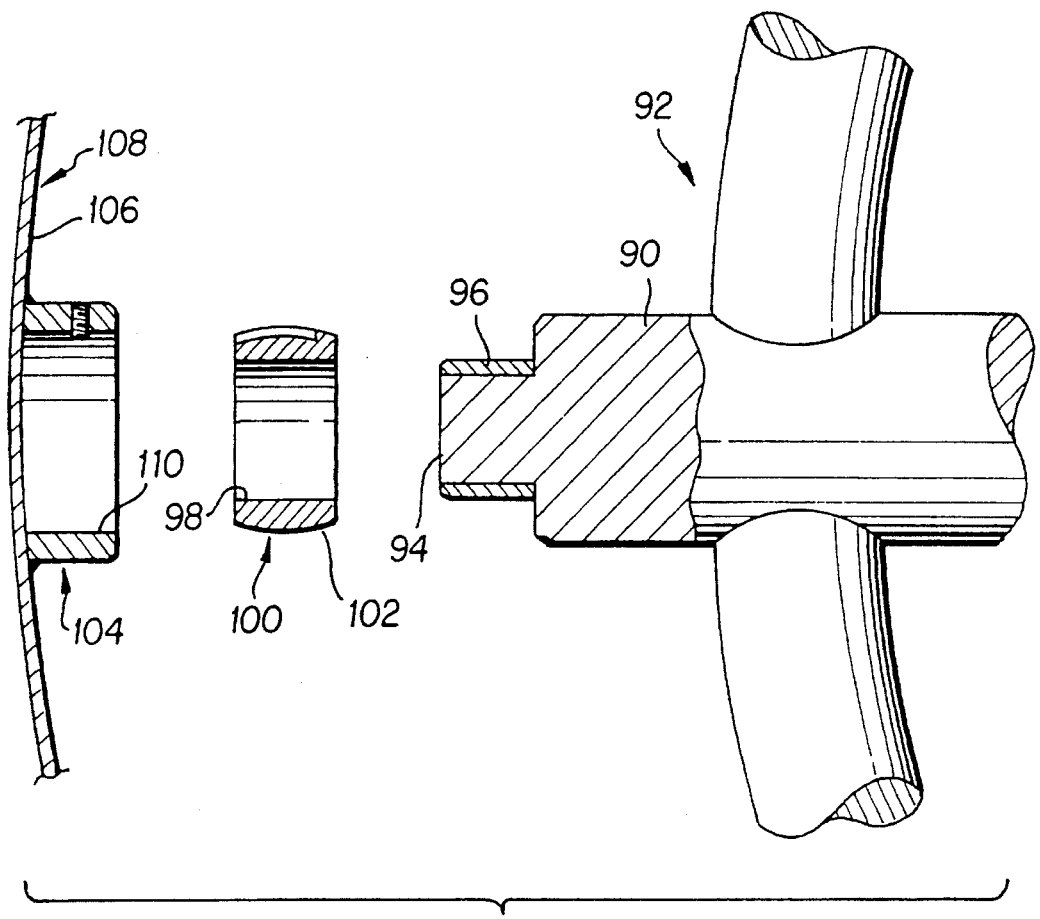
FIG. 9 is an elevational view in partial section of another embodiment of the invention.

Another embodiment of the invention is shown in FIG. 9 wherein the idler pin 56 of FIG. 2 inter alia is formed integrally with the rotary shaft 70 of FIG. 2. In FIG. 9, a rotary shaft 90 of agitator 92 has a bearing mount extension 94 formed integrally with said shaft 90, the extension 94 being cylindrical in conformation and having a diameter less than the diameter of the shaft 90. A consummable stainless steel bearing sleeve 96 is press fit onto the bearing mount extension 94 such as by heating of the sleeve 96 and then pressing the sleeve 96 onto the extension 94. The sleeve 96 is preferably sized to be received into channel 98 of replaceable idler bushing 100 in the same manner as the bearing element 54 of FIG. 2 is received into the channel 52 of the bushing 44. The bushing 100 is seen to be slightly radiused at 102 about its exterior surface to allow for improved shaft alignment. The bushing 44 of FIG. 2 could also be configured with such a radius. The bushing 100 is otherwise configured as is the bushing 44 of FIG. 2 and cooperates with idler bushing holder 104 in the same manner as the bushing 44 of FIG. 2 cooperates with the idler bushing holder 36. The bushing holder 104 is mounted directly to an inner wall 106 of kettle 108. The bushing holder 104 is cylindrical in conformation and has a channel 110 formed centrally therein and dimensioned to receive the replaceable idler bushing 100 which is formed of the 88 Alloy referred to hereinabove. The bushing holder 104 is provided with a retainer pin 112 which functions in the manner of the pin 48 of FIG. 2 and cooperates with structure of the idler bushing 100 which is identical to the corresponding structure of the idler bushing 44 of FIG. 2 inter alia. In the structure of FIG. 9, the sleeve 96 is a consummable and thus replaceable portion of the structure.

While the invention has been described in relation to the particular structure shown in the drawings, it is to be understood that the invention can be otherwise configured while remaining within the intended scope of the invention. In so considering, it is therefore apparent that the scope of the invention is defined in light of the appended claims.

What is claimed is:

1. In combination, a kettle having inner walls and an agitator having a rotary shaft, the rotary shaft having a distal end mounted within the kettle and having a free end mounted to a drive system for rotation of the shaft to mix materials being processed within the kettle, the combination further comprising:

a replaceable idler bushing having a body portion with a channel formed therein;

mounting means affixed to the inner wall of the kettle for mounting the idler bushing; and, a replaceable idler pin having a bearing element formed on one end thereof for receipt into the channel formed in the idler bushing and attachment means formed on the other end thereof for attaching the idler pin to the distal end of the rotary shaft, surfaces of the bearing element bearing against surfaces of the channel formed in the body portion of the idler bushing to accommodate rotational movement therebetween, excessive wear and/or damage to the idler bushing and/or idler pin being accommodated without diminishment of utility of the combination by replacement of either or both of the idler bushing and idler pin.

2. The combination of claim 1 wherein either the surfaces of the bearing element of the idler pin contacting the surfaces of the channel formed in the body portion of the idler bushing are formed of a self-lubricating nickel alloy and the other said surfaces are formed of stainless steel.

3. The combination of claim 1 wherein at least the surfaces of the channel formed in the idler bushing are formed of a self-lubricating nickel alloy.

4. The combination of claim 1 wherein the idler bushing is formed of a self-lubricating nickel alloy.

5. The combination of claim 1 wherein the mounting means comprise a cylindrical idler bushing holder having a channel formed along the longitudinal axis thereof, the idler bushing being cylindrical in conformation and being dimensioned to be received substantially flushly within the channel formed within the idler bushing holder.

6. The combination of claim 5 wherein a bore is formed through a wall portion of the idler bushing holder and further comprising a retainer pin fixable in the holder at a desired extension of one end of said pin into the interior of the channel formed in the holder, said one end of the retainer pin engaging the idler bushing to retain said bushing within the channel formed in the bushing holder.

7. The combination of claim 6 wherein a T-shaped slot is formed in an outer surface of the idler bushing, the slot having a leg slot portion intersecting the peripheral edge of that end of the bushing first received into the channel formed in the bushing holder, the slot further having arm slot portions extending one each from an opposite end of the leg slot portion, the end of the retainer pin extending into the channel formed in the holder following the leg slot portion on insertion of the bushing into the holder, the end of the retainer pin extending into one of the arm slot portions on partial rotation of the bushing about the longitudinal axis thereof acting to seat the end of the pin in one of the arm slot portions depending upon the rotation of the rotary shaft of the agitator.

8. The combination of claim 7 wherein the bushing is formed of a self-lubricating nickel alloy.

9. The combination of claim 5 wherein the channel formed in the idler bushing is enlarged in diameter about a semicylindrical portion thereof at the end of said bushing receiving at least a portion of the idler pin thereinto, thereby to facilitate removal of the shaft and the idler pin therefrom.

10. The combination of claim 9 wherein the bushing is formed of a self-lubricating nickel alloy.

11. The combination of claim 1 wherein the attachment means comprise a threaded shaft formed on the bearing element of the idler pin, the distal end of the rotary shaft having a threaded bore formed therein, the longitudinal axis of the threaded bore being coincident with the longitudinal axis of the rotary shaft, the threaded shaft of the idler pin mating with the threaded bore of the rotary shaft to removably attach the idler pin to the rotary shaft.

12. The combination of claim 11 wherein the mounting means comprise a cylindrical idler bushing holder having a channel formed along the longitudinal axis thereof, the idler bushing being cylindrical in conformation and being dimensioned to be received substantially flushly within the channel formed in the idler bushing holder.

13. The combination of claim 12 wherein a bore is formed through a wall portion of the idler bushing holder and further comprising a retainer pin fixable in the holder at a desired extension of one end of said pin into the interior of the channel formed in the holder, said one end of the retainer pin engaging the idler bushing to retain said bushing within the channel formed in the bushing holder.

14. The combination of claim 13 wherein a T-shaped slot is formed in an outer surface of the idler bushing, the slot having a leg slot portion intersecting the peripheral edge of that end of the bushing first received into the channel formed in the bushing holder, the slot further having arm slot portions extending one each from an opposite end of the leg slot portion, the end of the retainer pin extending into the channel formed in the holder following the leg slot portion on insertion of the bushing into the holder, the end of the retainer pin extending into one of the arm slot portions on partial rotation of the bushing about the longitudinal axis thereof to locate for seating that end of the pin in one of the arm slot portions depending upon the rotation of the rotary shaft of the agitator.

15. The combination of claim 14 wherein the bushing is formed of a self-lubricating nickel alloy.

16. The combination of claim 14 wherein the channel formed in the idler bushing is enlarged in diameter about a semicylindrical portion thereof at the end of said bushing receiving at least a portion of the idler pin thereinto, thereby to facilitate removal of the shaft and the idler pin therefrom.

17. The combination of claim 16 wherein the bushing is formed of a self-lubricating nickel alloy.

18. The combination of claim 1 wherein the rotary shaft of the agitator is horizontally mounted within the kettle.

* * * * *